United States Patent
Hendrey et al.

(10) Patent No.: US 7,813,741 B2
(45) Date of Patent: Oct. 12, 2010

(54) SYSTEM AND METHOD FOR INITIATING RESPONSES TO LOCATION-BASED EVENTS

(75) Inventors: Geoffrey Hendrey, San Francisco, CA (US); Chandrashekar Basavaiah, San Jose, CA (US); Tony Campione, Ile Bizard (CA); Scott Stouffer, San Francisco, CA (US)

(73) Assignee: deCarta Inc., San Jose, CA (US)

( * ) Notice: Subject to any disclaimer, the term of this patent is extended or adjusted under 35 U.S.C. 154(b) by 679 days.

(21) Appl. No.: 10/198,622

(22) Filed: Jul. 17, 2002

(65) Prior Publication Data

US 2003/0060214 A1 Mar. 27, 2003

Related U.S. Application Data

(63) Continuation-in-part of application No. 10/012,367, filed on Dec. 12, 2001, now Pat. No. 7,010,308.

(60) Provisional application No. 60/305,873, filed on Jul. 18, 2001.

(51) Int. Cl.
H04W 24/00 (2009.01)
H04M 11/04 (2006.01)
(52) U.S. Cl. ............... 455/456.1; 455/404.2; 455/456.3
(58) Field of Classification Search ............... 455/456.1, 455/456.3, 414.1, 414.3, 456.2, 412.1, 412.2, 455/456.4, 456.5, 456.6, 414.2, 404.2, 404.1
See application file for complete search history.

(56) References Cited

U.S. PATENT DOCUMENTS 5,043,736 A 8/1991 Darnell et al.
5,295,180 A 3/1994 Vendetti et al.
5,539,922 A 7/1996 Wang
5,568,153 A 10/1996 Béliveau
5,758,288 A 5/1998 Dunn et al.

(Continued)

FOREIGN PATENT DOCUMENTS

EP 0 708 571 A2 4/1996

(Continued)

OTHER PUBLICATIONS

PCT International Search Report, International Application No. PCT/US00/29516, Sep. 24, 2003, 6 pages.

(Continued)

*Primary Examiner*—George Eng
*Assistant Examiner*—Brandon J Miller
(74) *Attorney, Agent, or Firm*—Fenwick & West LLP

(57) ABSTRACT

A system and method for initiating responses to location-based events includes a rules system for applying one or more rules to state/attribute information corresponding to one or more mobile units, to determine if a location-based event has occurred. If it is determined that a location-based event has occurred, a response is provided to one or more location-based services applications. The response can be used by the location-based services applications to provide location-based services, such as email, instant messaging, paging and the like. A state/attribute database can be used with the system and method to store and update the state/attribute information corresponding to the one or more mobile units.

24 Claims, 12 Drawing Sheets

U.S. PATENT DOCUMENTS

| | | | |
|---|---|---|---|
| 5,761,648 | A | 6/1998 | Golden et al. |
| 5,774,802 | A | 6/1998 | Tell et al. |
| 5,852,775 | A | 12/1998 | Hidary |
| 5,873,040 | A | 2/1999 | Dunn et al. |
| 5,884,272 | A | 3/1999 | Walker et al. |
| 5,918,180 | A | 6/1999 | Dimino |
| 5,953,400 | A | 9/1999 | Rosenthal et al. |
| 5,963,864 | A | 10/1999 | O'Neil et al. |
| 5,966,696 | A | 10/1999 | Giraud |
| 5,974,393 | A | 10/1999 | McCullough et al. |
| 5,982,281 | A | 11/1999 | Layson, Jr. |
| 5,995,015 | A | 11/1999 | DeTemple et al. |
| 6,018,699 | A | 1/2000 | Baron, Sr. et al. |
| 6,041,358 | A | 3/2000 | Huang et al. |
| 6,044,261 | A | 3/2000 | Kazmi |
| 6,047,327 | A | 4/2000 | Tso et al. |
| 6,052,122 | A | 4/2000 | Sutcliffe et al. |
| 6,055,434 | A | 4/2000 | Seraj |
| 6,060,995 | A | 5/2000 | Wicks et al. |
| 6,061,561 | A | 5/2000 | Alanara et al. |
| 6,061,681 | A | 5/2000 | Collins |
| 6,067,045 | A | 5/2000 | Castelloe et al. |
| 6,067,356 | A | 5/2000 | Lautenschlager et al. |
| 6,073,138 | A | 6/2000 | de l'Etraz et al. |
| 6,091,956 | A | 7/2000 | Hollenberg |
| 6,119,014 | A | 9/2000 | Alperovich et al. |
| 6,157,841 | A | 12/2000 | Bolduc et al. |
| 6,166,685 | A | 12/2000 | Soliman |
| 6,181,927 | B1 | 1/2001 | Welling, Jr. et al. |
| 6,208,866 | B1 * | 3/2001 | Rouhollahzadeh et al. ............ 455/456.5 |
| 6,233,506 | B1 | 5/2001 | Obradovich et al. |
| 6,286,005 | B1 | 9/2001 | Cannon |
| 6,292,672 | B1 | 9/2001 | Chavez, Jr. |
| 6,292,743 | B1 | 9/2001 | Pu et al. |
| 6,332,127 | B1 | 12/2001 | Bandera et al. |
| 6,351,221 | B1 * | 2/2002 | Phillips et al. ......... 340/825.49 |
| 6,360,102 | B1 | 3/2002 | Havinis et al. |
| 6,370,539 | B1 | 4/2002 | Ashby et al. |
| 6,377,793 | B1 | 4/2002 | Jenkins |
| 6,381,465 | B1 | 4/2002 | Chern et al. |
| 6,397,057 | B1 | 5/2002 | Malackowski et al. |
| 6,400,956 | B1 | 6/2002 | Richton |
| 6,411,891 | B1 | 6/2002 | Jones |
| 6,434,381 | B1 * | 8/2002 | Moore et al. ............. 455/414.3 |
| 6,442,391 | B1 | 8/2002 | Johansson et al. |
| 6,463,180 | B1 | 10/2002 | Krishnaswamy |
| 6,480,713 | B2 * | 11/2002 | Jenkins .................... 455/412.1 |
| 6,484,148 | B1 | 11/2002 | Boyd |
| 6,486,801 | B1 * | 11/2002 | Jones ........................ 340/994 |
| 6,505,046 | B1 * | 1/2003 | Baker ...................... 455/456.3 |
| 6,549,768 | B1 * | 4/2003 | Fraccaroli ................ 455/456.3 |
| 6,594,483 | B2 * | 7/2003 | Nykanen et al. ............ 455/411 |
| 6,647,257 | B2 * | 11/2003 | Owensby ................. 455/414.1 |
| 6,650,902 | B1 * | 11/2003 | Richton ................... 455/456.3 |
| 6,662,014 | B1 * | 12/2003 | Walsh ...................... 455/456.2 |
| 6,675,017 | B1 * | 1/2004 | Zellner et al. ............ 455/456.1 |
| 6,684,068 | B1 * | 1/2004 | Tikka et al. .............. 455/412.1 |
| 6,725,051 | B2 * | 4/2004 | Fidler ...................... 455/456.1 |
| 6,750,883 | B1 | 6/2004 | Parupudi et al. |
| 6,799,049 | B1 * | 9/2004 | Zellner et al. ............ 455/456.1 |
| 6,826,598 | B1 | 11/2004 | Titmuss et al. |
| 6,836,667 | B1 * | 12/2004 | Smith, Jr. ................. 455/456.1 |
| 7,027,801 | B1 * | 4/2006 | Hall et al. ................ 455/412.1 |
| 2001/0027111 | A1 | 10/2001 | Motegi et al. |
| 2002/0102993 | A1 * | 8/2002 | Hendrey et al. ............. 455/456 |
| 2002/0128850 | A1 * | 9/2002 | Chen et al. ..................... 705/1 |
| 2003/0004776 | A1 * | 1/2003 | Perrella et al. ................. 705/9 |

FOREIGN PATENT DOCUMENTS

| | | |
|---|---|---|
| WO | WO 97/13387 | 4/1997 |
| WO | WO 97/14054 | 4/1997 |
| WO | WO 97/16934 | 5/1997 |
| WO | WO 97/41654 | 11/1997 |
| WO | WO 98/03025 | 1/1998 |
| WO | WO 98/36585 | 8/1998 |
| WO | WO 99/05597 | 2/1999 |
| WO | WO 99/33199 | 7/1999 |
| WO | WO 99/33293 | 7/1999 |
| WO | WO 99/56144 | 11/1999 |
| WO | WO 99/66757 | 12/1999 |
| WO | WO 00/04730 | 1/2000 |
| WO | WO 00/19344 | 4/2000 |
| WO | WO 00/22860 | 4/2000 |
| WO | WO 00/35216 | 6/2000 |
| WO | WO-00/40038 | 7/2000 |
| WO | WO 00/51333 | 8/2000 |
| WO | WO 00/62564 | 10/2000 |
| WO | WO 01/15480 A1 | 3/2001 |
| WO | WO 01/24551 | 4/2001 |
| WO | WO 01/26408 A1 | 4/2001 |

OTHER PUBLICATIONS

Krishna et al., "Static and Adaptive Location management in Mobile Wireless Networks," Computer Communications, Elsevier Science Publishers BV, vol. 19, No. 4, Apr. 1, 1996, pp. 321-334.

Nelson, "User Interaction with Machines on the Move: Location Aware Computing," Computers in Industry, Elsevier Science Publishers BV, vol. 29, No. 1, Jul. 1, 1996, pp. 63-70.

PCT International Search Report, International Application No. PCT/US01/47952, Jul. 14, 2003, 5 pages.

Hadfield, Peter. "You can run, but you can't hide." Aug. 21, 1999, *New Scientist*.

PCT International Search Report, International Application No. PCT/US01/18580, Oct. 17, 2001, 7 pages.

PCT International Search Report, International Application No. PCT/US01/18605, Oct. 17, 2001, 7 pages.

PCT International Search Report, International Application No. PCT/US01/18837, Oct. 17, 2001, 7 pages.

PCT International Search Report, International Application No. PCT/US01/21336, Sep. 5, 2002, 7 pages.

PCT International Search Report, International Application No. PCT/US02/22709, Nov. 22, 2002, 6 pages.

PCT International Search Report, International Application No. PCT/US01/21335, Feb. 6, 2003, 6 pages.

* cited by examiner

SYSTEM AND METHOD FOR INITIATING RESPONSES TO LOCATION-BASED EVENTS

CROSS-REFERENCE TO RELATED APPLICATIONS

This application claims priority under 35 U.S.C. §119(e) of U.S. Provisional Application No. 60/305,873, filed Jul. 18, 2001, and is a continuation-in-part of U.S. application Ser. No. 10/012,367, filed Dec. 12, 2001. Each of these applications is incorporated by reference herein.

BACKGROUND

1. Field of the Invention

The invention relates generally to mobile telecommunication systems, and in particular, to a system and method for initiating responses to location-based events, based on state/attribute information (e.g., user location, current time, preferences for location-based services).

2. Background

Mobile telecommunication units (hereinafter also referred to as "mobile units"), such as in-vehicle navigation systems, cellular phones and other wireless devices, have become a pervasive part of many cultures. For example, a wireless phone is a valuable emergency tool that can be taken almost anywhere. For many users, the ability to call for help in an emergency is the principal reason they own a wireless phone. But that help may never arrive, or may be too late, if the call does not get through or if emergency response teams cannot locate the user quickly.

In a senes of orders since 1996, the Federal Communications Commission (FCC) has taken action to improve the quality and reliability of 911 emergency services for wireless phone users, by adopting rules to govern the availability of basic 911 services and the implementation of enhanced 911 (E911) for wireless emergency services in the United States. The E911 rules seek to improve the reliability of wireless 911 emergency services and to provide emergency services personnel with location information that will enable these emergency services personnel to locate and assist wireless 911 callers. The E911 rules require that wireless carriers deliver 911 calls and implement the technology that provides the 911 emergency call response center with information about the caller's location.

The approximate location of a mobile unit is typically known to the telecommunication infrastructure based on knowledge of which base station is communicating with the mobile unit. Unfortunately, such coarse position information is inadequate for most emergency applications. To improve the effectiveness of such applications, various positioning technologies have been leveraged to increase the accuracy of position information. One particular solution integrates Global Positioning System (GPS) information into the telecommunication infrastructure to accurately determine the locations of mobile units within a defined reference system. Another solution uses a network of low powered beacons scattered throughout the usage area to provide more precise position information for mobile units. Regardless of the positioning technology used, telecommunication systems now have the ability to accurately determine the geographic location of mobile units using precise location information.

The advent of precise location information for mobile units has made possible location-based services (LBS). Some examples of LBS service applications include, without limitation, routing, content searching, tracking and value-added analysis. Routing applications provide a user with detailed routing information between two or more locations including, for example, turn-by-turn directions, trip distance and expected travel time. Content searching provides location-relevant information to segments or groups of users who share a common information need, such as subscribers to a wireless service and a group of employees. Typical types of location-based content include, without limitation, directories, news, weather, traffic, points-of-interest (POI) and emergency alerts. Tracking services can be used to track various classes of users. These would include various classes of individuals (e.g., children, elderly), assets (e.g., equipment, vehicles) and fleets (e.g., service vehicles). Value-added analysis services include predicting traffic problems based on current conditions, gathering information (e.g., frequency, timing) about users passing by a particular location, designing systems that can be dynamically reconfigured based on the location of user demand, or determining the location of a cell tower installation based on previously collected location data.

Although most LBS applications are developed to enhance the user's wireless experience, research indicates that wireless subscribers may not want wireless marketing and advertisers to know their specific location. Indeed, many wireless and online service providers are altering their wireless strategies due to negative reaction to location-based advertising. For example, a wireless subscriber may not want to be inundated with advertisements each time he or she walks by a business or while at home. The subscriber, however, may want to know if a specific product is on sale at a nearby store. In this case, the subscriber is in control of the location information and decides when and with whom to share their location information. With the increasing pervasiveness of wireless phones, the subscriber's privacy concerns must be addressed to ensure the viability of LBS technology.

Accordingly, there is a need for a system and method for initiating responses to location-based events based on state/attribute information (e.g., location, time, user preferences for location-based services).

SUMMARY OF THE INVENTION

The present invention overcomes the deficiencies of conventional systems and methods by providing systems, methods, software and mobile units for initiating responses to location-based events based on state/attribute information (e.g., location, time, user preferences for location-based services).

The present invention generally comprises a rules system for evaluating state/attribute information corresponding to one or more mobile units. The state/attribute information can be provided by a state/attribute database or directly from a data stream, such as a positioning system (e.g., GPS). A change in the state/attribute information of a mobile unit (such as location) results in a location-based event, which triggers the execution of one or more actions. A response (which is generated by the execution of an action) is provided to one or more location-based services applications. The location-based services application provides location-based services to users based on the response. These services can include, without limitation, email, instant messaging, paging and the like.

In one embodiment of the present invention, a system for initiating a response to a location-based event comprises a database for storing information corresponding to at least one mobile unit. A portion of the information is indicative of the location of at least one mobile unit. A rules system is coupled to the database, for applying a rule to the information to determine if a location-based event has occurred. Responsive to a determination that a location-based event has occurred, a response is provided to a location-based services application.

In another embodiment of the present invention, a method of initiating a response to a location-based event comprises: storing information corresponding to at least one mobile unit, wherein a portion of the information is indicative of the location of at least one mobile unit, applying a rule to the information to determine if a location-based event has occurred, and responsive to a determination that a location-based event has occurred, providing a response to a location-based services application.

In another embodiment of the present invention, a location-based services application system comprises a user interface for receiving user data. A rule generator is coupled to the user interface, for generating a rule based on the user data. The rule is indicative of the user's preferences for receiving location-based services. The system also includes an interface for transmitting the rule to a rules system to determine if a location-based event has occurred.

In another embodiment of the present invention, a mobile unit adapted for receiving a response to a location-based event comprises an interface for receiving the response, wherein the response is generated by a rules system by applying a rule to state/attribute information. A location-based service application is coupled to the interface for providing a location-based service based on the response.

In yet another embodiment of the present invention, a system for initiating a response to a location-based event comprises a positioning system for providing the location of a mobile unit, and a rules system operatively coupled to the positioning system, for determining whether a location-based event has occurred by applying a rule to state/attribute information. In response to a determination that a location-based event has occurred, the rules system provides a response to the location-based services application.

DETAILED DESCRIPTION OF EMBODIMENTS

Figure 1A:
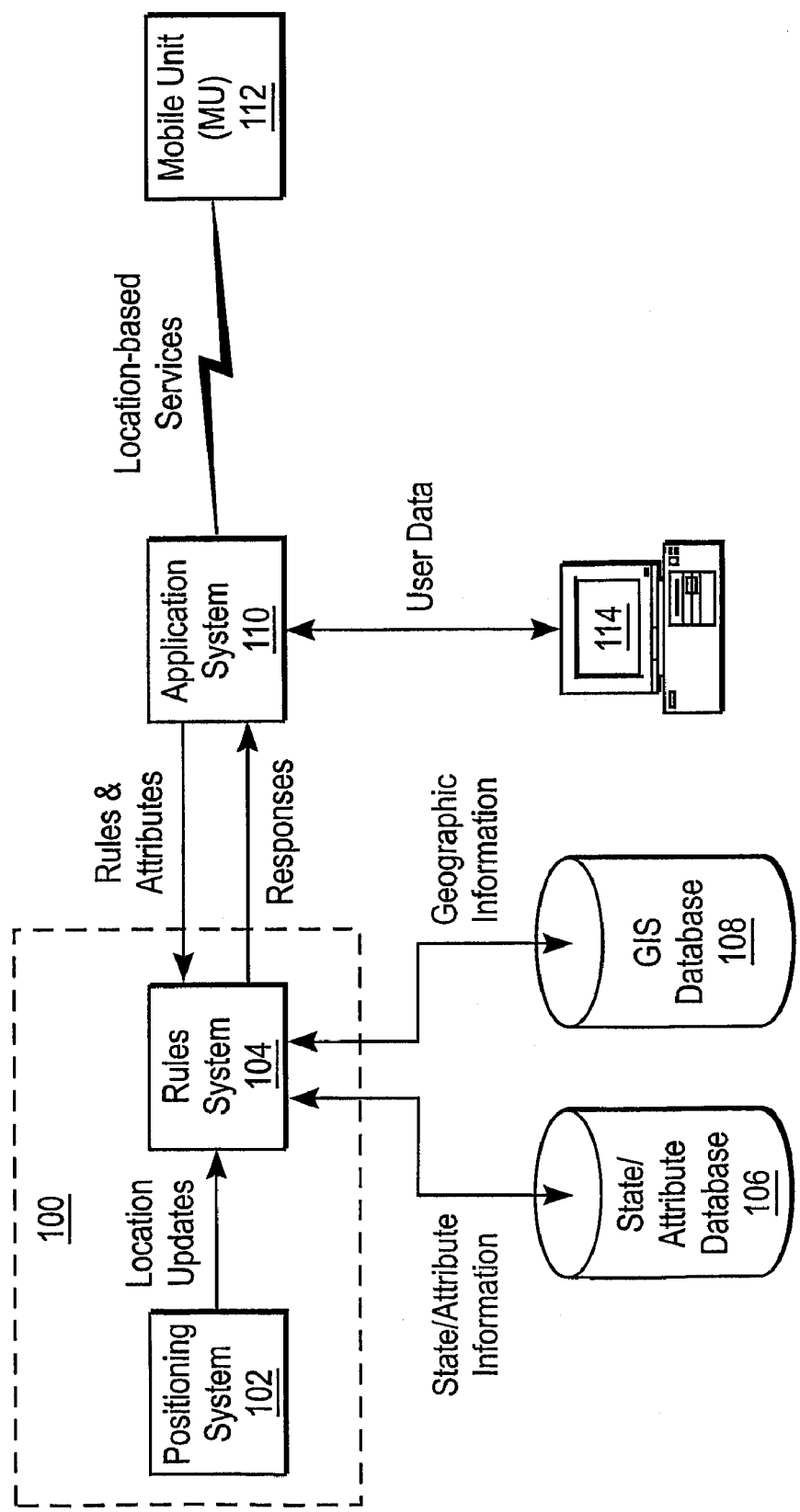
FIG. 1A is a block diagram of an LBS system, in accordance with one embodiment of the present invention.

As used herein, a mobile unit (MU) is a mobile telecommunications transmitter, transceiver, receiver or the like, capable of supporting a wireless connection, whether used for data or voice communications. Examples include, without limitation, cell phones, pagers, wireless web browsers, personal digital assistances, navigation systems (e.g., in-vehicle) and laptop, handheld, and wearable computers. Although only one mobile unit 112 is shown in FIG. 1A, any number of mobile units 112 can be used with the present invention. Likewise, any number of application systems 110 can be used with the present invention.

Referring to FIG. 1, there is shown a block diagram of an LBS system 100 in accordance with one embodiment of the present invention. The LBS system 100 generally includes a positioning system 102 operatively coupled to a rules system 104. The LBS system 100 is optionally coupled to a state/attribute database 106 and a Geographic Information System (GIS) database 108. The LBS system 100 is also coupled to an application system 110, which is capable of running one or more LBS applications. The application system 110 communicates with a mobile unit 112 through a communication transmission medium (e.g., a wireless link). The LBS system 100 can be part of a larger telecommunications network, such as the Groupe Spécial Mobile (GSM) wireless telecommunications network, which delivers mobile voice and data services around the world.

The positioning system 102 determines the location of the mobile unit 112 (and other mobile units) within a defined reference frame. In one embodiment, the positioning system 102 is a Gateway Mobile Location Center (GMLC), which provides location updates (e.g., latitude, longitude) for mobile units traveling within a defined usage area. The position updates can be provided on a periodic basis or upon request from the rules system 104.

The rules system 104 receives the location updates from the positioning system 102 (or from a database as described below) and uses the updates, along with other state/attribute or geographic information, to determine if one or more location based events have occurred. The rules system 104 performs any actions associated by a rule with a location-based event. The rules system 104 initiates one or more responses to each action, which are provided to the application system 110. For example, if the application system 110 requests to be informed when a user is at a particular location at a particular time, such request can be executed by the action to get the user location and current time.

The application system 110 uses the response(s) received from the rules system 104 to provide location-based services, including without limitation, communicating with users through email, instant messaging, paging or the like. For example, a user can create a rule triggered by an event defined by proximity to a coffee house location between the hours of 8:00 a.m. and 9:00 a.m. If the rule is triggered, a response is generated by the rules system 104 and sent to the application system 110. Upon receipt of the response, the application system 110 sends an electronic coupon to the user via the mobile unit 112 for a free cup of coffee along with driving directions and/or a map.

In one embodiment, the LBS system 100 is coupled to a GIS database 108, for providing geographic information (e.g., landmarks, points-of-interest, maps, routes, etc.) to enable "mobile-to-static" services. One example of a mobile-to-static service is a search for a particular type of business, landmark or other point-of-interest nearest the mobile unit 112.

In one embodiment, the LBS system 100 is coupled to a state/attribute database 106, for providing state/attribute information corresponding to one or more mobile users. State information includes, without limitation, any information that is indicative of the state of a system. For in-vehicle navigation applications, state information could include position, velocity, acceleration, attitude, fuel level, cabin temperature or pressure, or any other variable that can provide information about the state of the vehicle. This state information may be generated externally, such as position information from GPS, or locally, such as fuel level from an onboard sensor. For example, a user of an in-vehicle navigation system may request to be notified by an LBS application whenever the user is separated by less than 1 Km from a gas station and the user's vehicle gas tank state is "empty." Attribute information includes, without limitation, any information that ascribes a characteristic or quality to a person or thing. For dating applications, attributes could include gender, race, hair or eye color, height, weight, age, or any other information about a person or thing. For example, a male user of a dating application may request to be notified by an LBS application whenever a female user is separated by less than 1 Km from the user between the hours of 3:00 p.m. and 8:00 p.m.

Attribute information can also include a user's preferences. For example, a user may request not to be notified whenever the user is at home between the hours of 6:00 p.m. and 6:00 a.m. The setting of a user's preference for visibility to other user requests is discussed more fully in reference to FIG. 3.

Geographic information can be combined with state/attribute information to provide LBS services. For example, a user may request notification from an LBS application whenever the user is with 1 Km of his favorite restaurant. Geographic information, such as the location of the user's favorite restaurant, can be included in the state/attribute database 106, or can be provided by a separate GIS database 108.

One exemplary state/attribute database 106 can be the database server 530 in combination with the moving point index server 532, as described with reference to FIG. 5. Another exemplary state/attribute database 106 is described in U.S. application Ser. No. 10/012,367, filed Dec. 12, 2001, entitled "Managing and Querying Moving Point Data," which discloses techniques for storing and updating the locations of one or more mobile units in a database. Yet another exemplary state/attribute database 106 is the spatial database described in U.S. Pat. No. 5,963,956, entitled "System and Method of Optimizing Database Queries in Two or More Dimensions," which is incorporated herein by reference.

A user computer system 114 is optionally coupled to the application system 110 via a communication network, such as the Internet. The computer system 114 provides an alternative interface with the application system 110, enabling a user to select location-based services and to specify his or her preferences.

The rules system 104 is coupled to the application system 110, which can be an LBS application running on a computer system. The application system 110 receives one or more responses generated by the rules system 104 and delivers location-based services to the mobile unit 112 based on such response(s). In one embodiment, a user can subscribe to an LBS application by accessing a web site of an LBS application provider via the World Wide Web through the mobile unit 112 or the computer system 114. The user can be prompted for personal information and preferences, including the ability to specify opt-out events. For example, a user may request not to be contacted during a specific time period or at a specific location, such as when the user is home, in a meeting or otherwise inaccessible. These preferences are formulated in one or more rules by a rule generator in the application system 110 and transmitted or otherwise provided to the rules system 104 to be applied to state information (e.g., location, time) retrieved from the state/attribute database 106 and/or the GIS database 108. If one or more rule triggering events are satisfied, the rules system 104 will execute actions associated with the triggered rule and will pass generated responses to a response handler associated with the rule. The response handler can report the responses to the application system 110, which can act upon the response in accordance with the type of location-based service requested. Location-based responses can include, without limitation, information requested by the user in the form of responses or signals, such as the location of the mobile unit 112 or a list of nearby users.

The present invention can be deployed in a variety of configurations, which may include all or some of the components shown in FIG. 1A. In one deployment, the positioning system 102, the rules system 104, the state/attribute database 106, and the application system 110 can be operated by a single entity, such as a wireless carrier or asset or vehicle tracking service. In another deployment, the positioning system 102, the rules system 104 and the state/attribute database 106 can be operated by one entity (e.g., carrier, asset tracking service), while the application system 110 can be operated by another entity, such as an Internet portal or application provider. In another deployment, the position system 102 is operated by one entity (e.g., carrier), the rules system 104 and state/attribute database 106 are operated by a second entity (e.g., application service provider (ASP)), and the application system 110 is operated by a third entity (e.g., Internet portal or application provider). In yet another deployment, the application system 110 is contained in the mobile unit 112.

For each deployment scenario described above, the present invention can be implemented as a computer program product stored on one or more computer-readable mediums in a distributed computer network, such as the network described with reference to FIG. 5. The computer program product can be coded using object-oriented technology (e.g., Java), and the communications between distributed objects can be implemented using various communication protocols, such as Java Messaging Service (JMS) and Hypertext Transfer Protocol (HTTP).

Figure 1B:
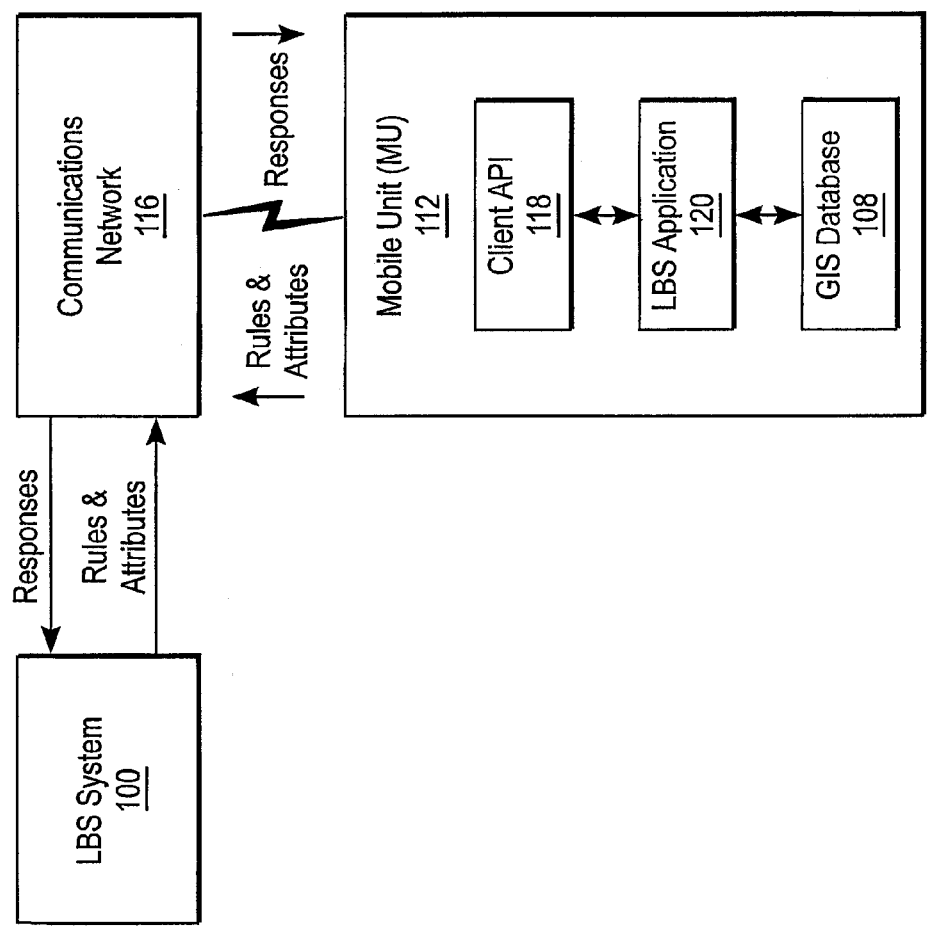
FIG. 1B is a block diagram of a mobile unit adapted to receive a response to a location-based event, in accordance with one embodiment of the present invention.

Referring to FIG. 1B, there is shown a block diagram of a mobile unit 112 adapted to receive location-based responses from a communication network 116, in accordance with one embodiment of the present invention. The mobile unit 112 includes a client Application Program Interface (API) 118 and an LBS application 120. Responses generated by location-based events and rules specifying user preferences are exchanged between the communications network 116 and the mobile unit 112 via the client API 118, using any suitable communications protocol (e.g., WAP, pub/sub messaging). The client API 118 can be coded as a Java client and run inside a Java Virtual Machine (JVM) in the mobile unit 112. The LBS application 120 provides location-based services to the mobile unit using location-based responses received from the communications network 116 via the client API 118.

The communications network 116 is coupled to the LBS system 100 described in reference to FIG. 1A, for receiving responses to location-based events. The communications network 116 formats the responses in accordance with the applicable communication protocol, then transmits the responses to the mobile unit 112. The communications network 116 performs a reverse procedure for rules and attribute information provided to the communications infrastructure 116 by the mobile unit 112. Alternatively, the LBS system 100 can be part of the communications network 116, depending on the particular deployment scenario.

The mobile unit 112 shown in FIG. 1B can optionally be coupled to a local GIS database 108 (e.g., CD-ROM), for providing various types of geographic information, which can be combined responses generated by location-based events to provide location-based services. With the LBS system 100, a user can be notified of an event (e.g., a favorite restaurant is nearby) and receive driving directions and/or a map for the quickest route to the restaurant from the user's current location.

Figure 2:
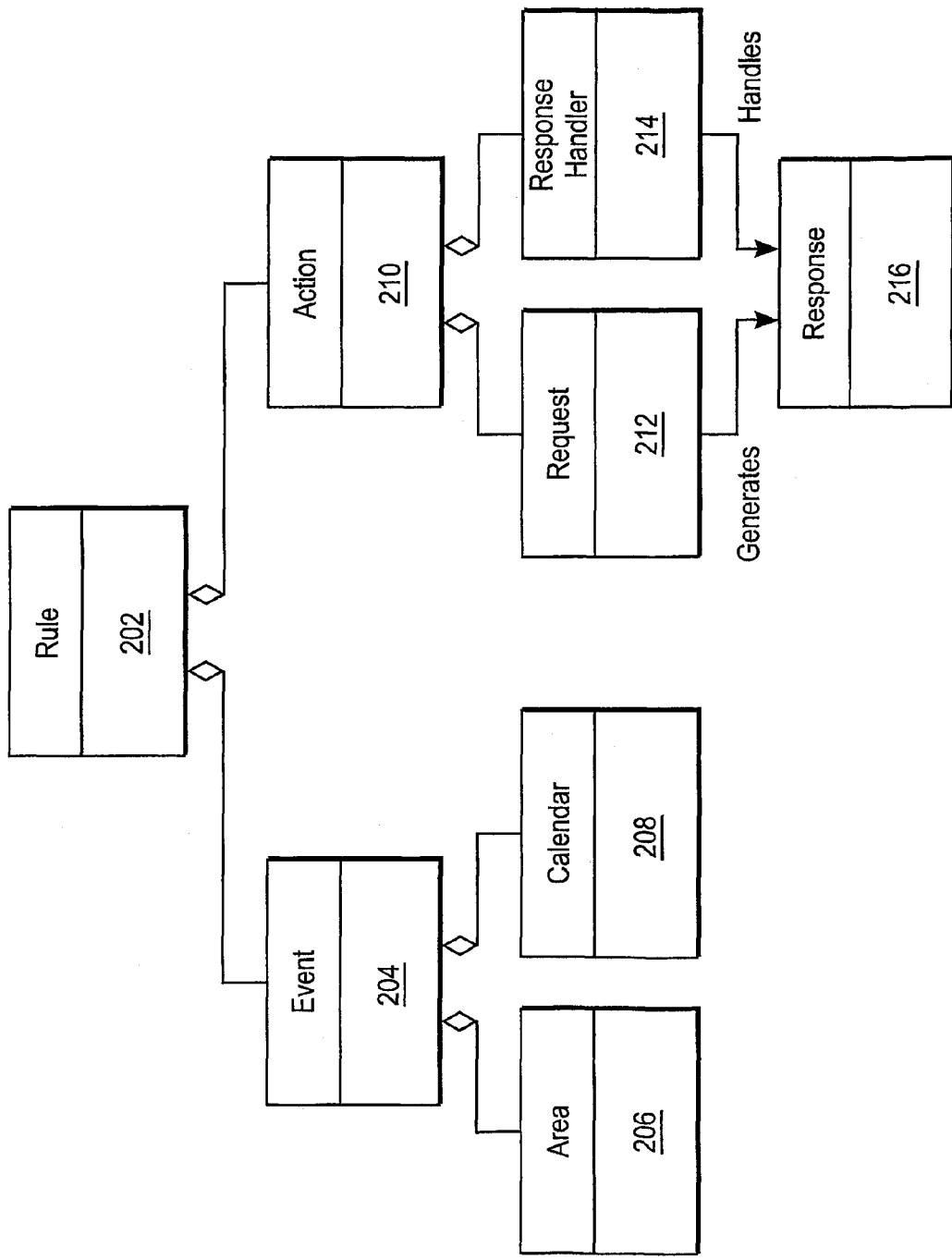
FIG. 2 is a class diagram for location/time-triggered rules, in accordance with one embodiment of the present invention.

Referring to FIG. 2, there is shown a class diagram for location/time-triggered rules, in accordance with one embodiment of the present invention. Under an object oriented rubric, rules can be composed through encapsulation of one or more Events 204 and one or more Actions 210. Event 204 further encapsulates an Area 206 and a Calendar 208. Classes can be extended by subclasses inheriting data and methods from a superclass, while providing additional data and methods not found in the superclass. Therefore, subclasses of Event 204 can be triggered by state/attribute information not limited to areas and calendars. Likewise, Actions 210 can be subclassed to provide difference schemes for executing actions triggered by Events 204.

When a rule is evaluated by the rules system 104, the Area 206 and the Calendar 208 are invoked to determine whether a location-based event has occurred. For example, the Area 206 includes data and methods for defining an area and determining if a mobile unit is inside the defined area. Similarly, the Calendar 208 includes data and methods for defining time intervals and determining if a time falls within the defined intervals.

The Action 210 further comprises Request 212 and Response Handler 214. The Request 212 includes data and methods for generating a Response 216 and the Response Handler 214 includes data and methods for handling responses to the Requests 216. Using the previous example, the Area 206 and Calendar 208 are evaluated to determine if a location-based event is occurring. The Action 210 is notified of the event and executes a request using data and methods belonging to the Request 212. In this example, a request may be the initiation of a search of nearby users and the Response 216 may be a list of nearby users. The Response Handler 214 includes the data and methods for handling a Response 216, in this case sending the Response 216, i.e., the list of nearby users, to the application system 110.

Figure 3:
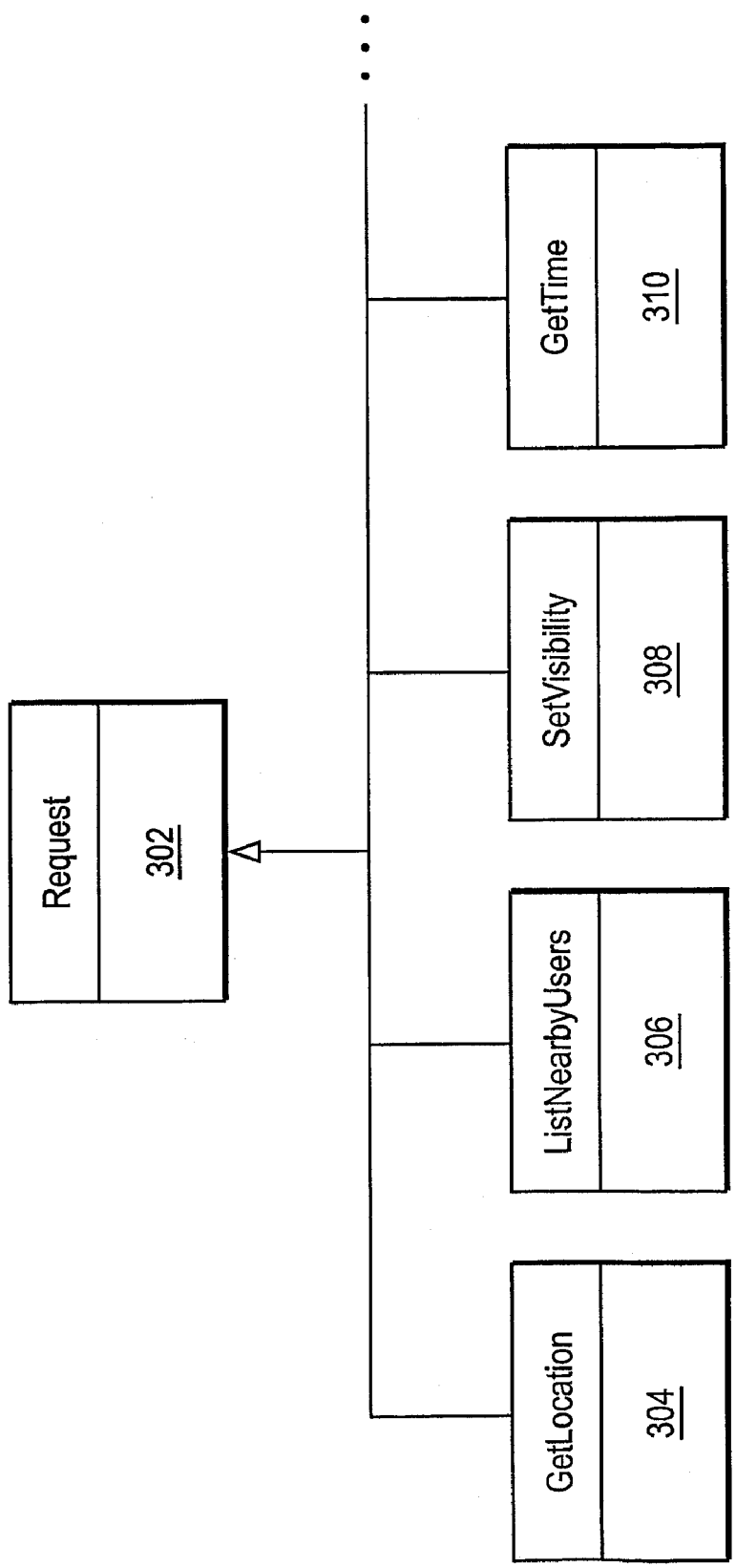
FIG. 3 is a class diagram for requests, in accordance with one embodiment of the present invention.

Referring to FIG. 3, there is shown a class diagram for location/time-triggered requests, in accordance with one embodiment of the present invention. A class Request 302 comprises one or more requests, such as GetLocation 304, ListNearbyUsers 306, SetVisibility 308 and GetTime 310. The request GetLocation 304 checks the user's location and returns the location to the application system 110 via the appropriate Response Handler 214, as described in reference to FIG. 4. The request ListNearbyUsers 306 searches the state/attribute database 106 for locations of nearby users and evaluates the locations in view of the user's preferences, including the user's visibility to other user requests. The request GetTime 310 retrieves the current time.

The request SetVisibility 308 sets the user visibility to other user requests, such as ListNearbyUser 306 requests. When made part of a rule, the SetVisibility 308 request allows dynamic rule-based privacy. For example, a user can specify a rule that when the user is home, the user is invisible to ListNearbyUsers 306 requests made by other users. This is an important feature of the present invention because it provides the user control over his or her privacy, which addresses a major shortcoming of conventional location-based services.

The requests described above are not exhaustive of the types of requests applicable to the present invention and other types of requests can be used with the present invention according to the needs of the particular LBS application.

Figure 4:
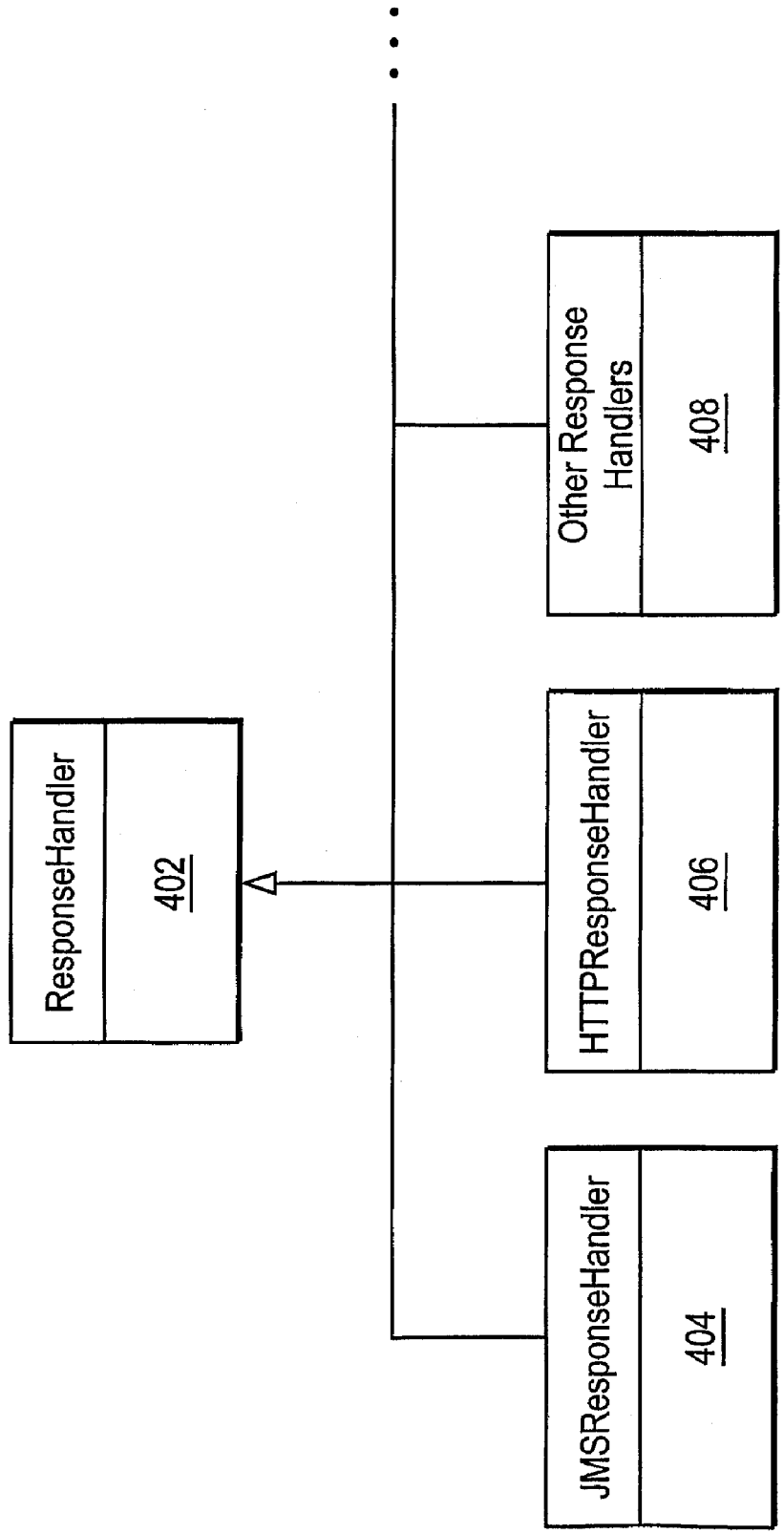
FIG. 4 is a class diagram for response handlers, in accordance with one embodiment of the present invention.

Referring to FIG. 4, there is shown a class diagram of response handlers, in accordance with one embodiment of the present invention. A class ResponseHandler 402 comprises handlers JMSResponseHandler 404 and HTTPResponseHandler 406. The JMSResponseHandler 404 enables responses to be delivered to the application system 110 using JMS services. The HTTPResponseHandler 406 enables responses to be delivered to the application system 110 using HTTP. Other subclasses 408 of ResponseHandler 402 can be provided to accomplish functions other than transmitting responses using JMS or HTTP protocols. For example, a subclass of ResponseHandler 402 could be provided to directly execute application logic.

Figure 5:
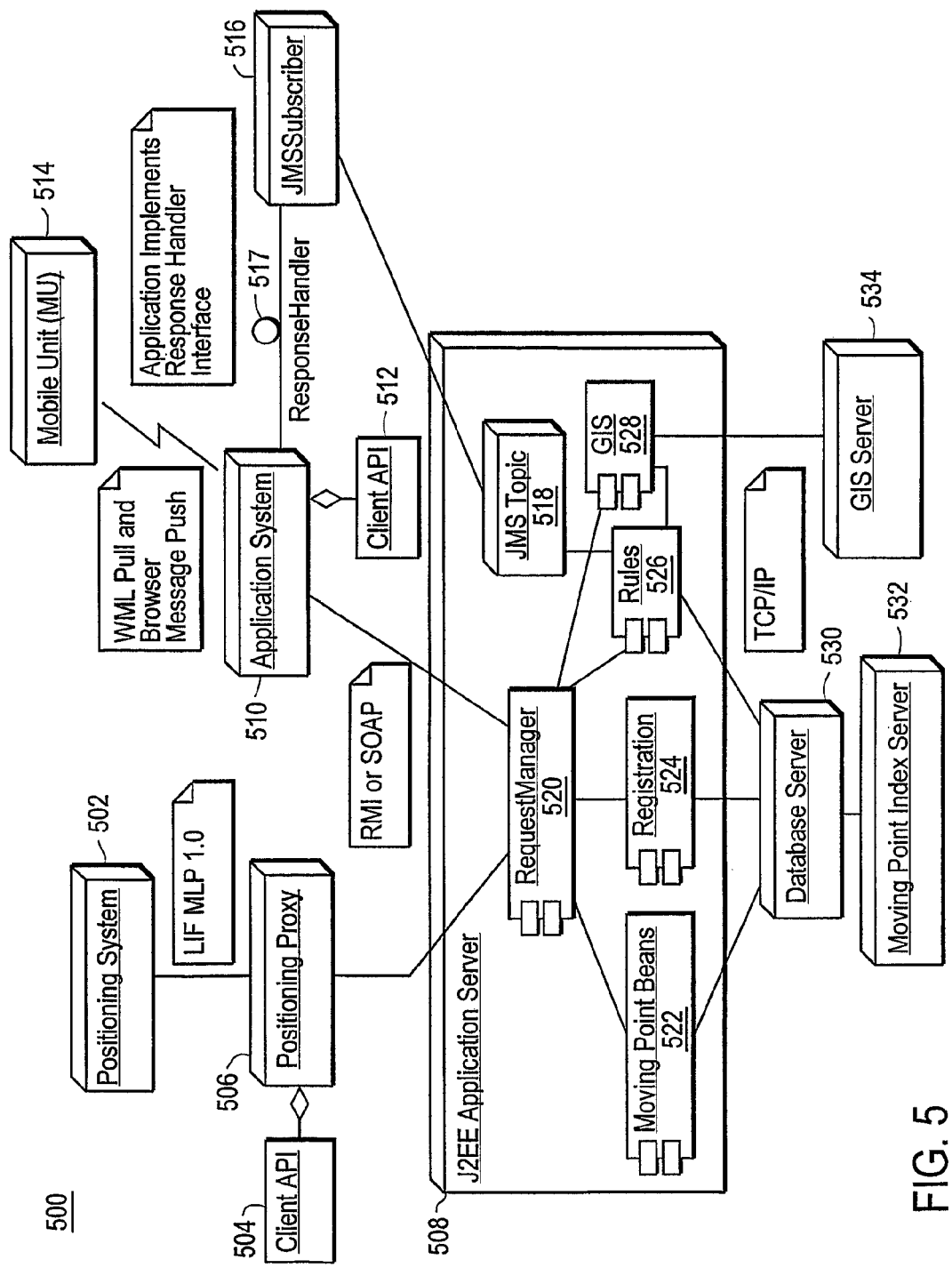
FIG. 5 is a detailed block diagram of a Location Server deployed in a distributed computer network, in accordance with one embodiment of the present invention.

Referring to FIG. 5, there is shown a detailed block diagram of a Location Server 508 deployed in a distributed computer network 500, in accordance with one embodiment of the present invention. In this embodiment, the present invention is a computer program product stored on one or more computer-readable mediums in a distributed computer network environment. One exemplary Location Server 508 that can be used to implement the present invention makes use of the Java™ 2 Enterprise Edition software platform, commonly referred to as "J2EE." A major advantage of this embodiment is that the computationally intensive components of the present invention can be implemented in the network and not in the mobile unit 112, allowing for a smaller form factor for the mobile unit 112. Another advantage is the use of proven object-oriented technology and standard protocols to provide a reliable and extensible computer network environment. That said, the present invention is not exclusive to the J2EE platform or the configuration shown in FIG. 5, but can be coded and deployed in a variety of configurations based on the desired deployment scenario.

The distributed computer network 500 generally includes a positioning system 502, a positioning proxy 506, the Location Server 508, an application system 510, a JMS subscriber 516, a database server 530, a moving point index server 532, and a GIS server 534. The Location Server 508 hosts the J2EE software platform (hereinafter also referred to as the "Location Server 508"), which enables the various components of the LBS system 500 to communicate with the Location Server 508 through a client API. A mobile unit 514 is communicatively coupled to the Location Server 508 via the application system 510. Any number of mobile units and application systems can be used with the LBS system 500.

In normal operation, the positioning system 502 (e.g., a GMLC) sends periodic location updates (e.g., latitude, longitude) and corresponding Mobile Station Identifiers (MSIDs) for one or more mobile units to a client API 504 (hereinafter also referred to as "Servlet 504") running in the positioning proxy 506. In one embodiment, the Servlet 504 responds to location update requests from the Location Server 508 by translating the position updates from the positioning system 502 into a format suitable for use by the Location Server 508 (e.g., from HTTP to object calls). The location updates can be provided by the positioning system 502 on a periodic basis or on-demand. One example of a protocol that can be used for providing location updates through the positioning proxy 506 is the Location Interoperability Forum (LIF) Mobile Location Protocol (MLP). Although the positioning proxy 506 is shown as a separate server in FIG. 5, it could also be part of the Location Server 508 depending upon the deployment scenario.

In one embodiment, the application system 510 includes a client API 512 (hereinafter also referred to as "Servlet Engine 512") running on a web server maintained by an application developer. The Servlet Engine 512 uses various objects provided by the Location Server 508 for request/response communication with the Location Server 508 via a JMS subscriber 516 and a request handler interface 517 running in the application system 510. The application system 510 can communicate with the mobile unit 514 either in a request/response fashion via Wireless Markup Language (WML) pages served by the web server, or via browser push messages. However, other known modes of communication are also within the scope of the present invention.

In one embodiment, the Location Server 508 generally includes the following Java entity beans: RequestManager 520, Moving Point Beans 522, Registration 524, Rules 526, and a JMS Topic publisher 518. The Location Server 508 also includes a Java session bean, referred to as GIS 528. The Location Server 508 is operatively coupled to the database server 530, which in turn is operatively coupled to the moving index point server 532. The GIS server 534 is operatively coupled to the Location Server 508 through the session bean, GIS 528. As shown in FIG. 5, all system requests flow through the RequestManager 520, which directs the requests to the appropriate Java beans in the Location Server 508, as described below.

In one embodiment, position updates provided by positioning proxy 506 are pushed down by the RequestManager 520 to the database server 530, which can be a commonly available Structured Query Language (SQL) database server. If the SQL database cannot adequately handle moving point data, a database-specific software interface (e.g., the Informix Blade API) can be used to instruct the database 530 to intercept particular SQL commands destined for the database server 530 and redirect those commands to the moving point index server 532. The moving point index server 532 is a network-connected appliance having a simple communications protocol for adding and deleting data points in a mobile unit location data structure. Thus, a SQL Insert command sent to the database server 530 can be intercepted by the database server 530, which makes a network call (e.g., TCP/IP) to the moving pointer index server 532 to add a location update to a mobile unit location data structure located in the moving point index server 532. Subsequent SQL Join commands can then be used to join user data from the database server 530 and location data indexed or contained in the moving point index server 532. The combined query result can then be provided to the Rules 526 entity beans. For example, an LBS dating application makes a ListNearbyUsers 306 request (See FIG. 3) for a list of male users having blonde hair, whose mobile units are within a one-mile radius of the mobile unit 514. In this case, data tables in the database server 530 containing data on male users who are blonde can be combined with location information for nearby users and sent to Rules 526 for evaluation. Additionally, GIS data (i.e., geographic information) from the GIS server 534 can be combined with user data from the database server 530 and location data from the moving point index server 532 via GIS 528 session beans. More information relating to moving point data can be found in U.S. patent application Ser. No. 10/012,367, filed December 12, entitled "Managing and Querying Moving Point Data."

In one embodiment, the rules can have the class structure previously described with reference to FIG. 2. Each rule can be cached within its associated Rules 526 entity bean, using well-known caching techniques for Java entity beans. Each rule is associated inside the database server 530 to the application system 510 and to mobile unit 514. These associations are established each time a new rule is added to Rules 526 via an Add Rule Request Sequence, as described in reference to FIG. 9. For example, if the application system 510 adds a rule for mobile unit 514 (i.e., user "Bob") an association is made in the database server 530 between the rule, the application system 510 and the mobile unit 514 (i.e., user "Bob"). When a location update occurs for user "Bob," the new location is mapped to the application system 510 and to the mobile unit 514, and all the rules that are associated with user "Bob" are applied to the combined data from the database server 530 and the moving point index server 512. The Registration 524 registers "Bob" to a particular application system and applies security mechanisms to ensure that only "Bob" receives the list of nearby users. The list of nearby users is sent back to the application system 510 associated with "Bob" (i.e. a "response" in FIG. 2) via the JMS Topic publisher 518. One exemplary JMS Topic publisher 518 is the WEBLOGIC™ Server 6.0, manufactured by BEA Systems, Inc. of San Jose, Calif., which provides asynchronous messaging using JMS services.

Figure 6:
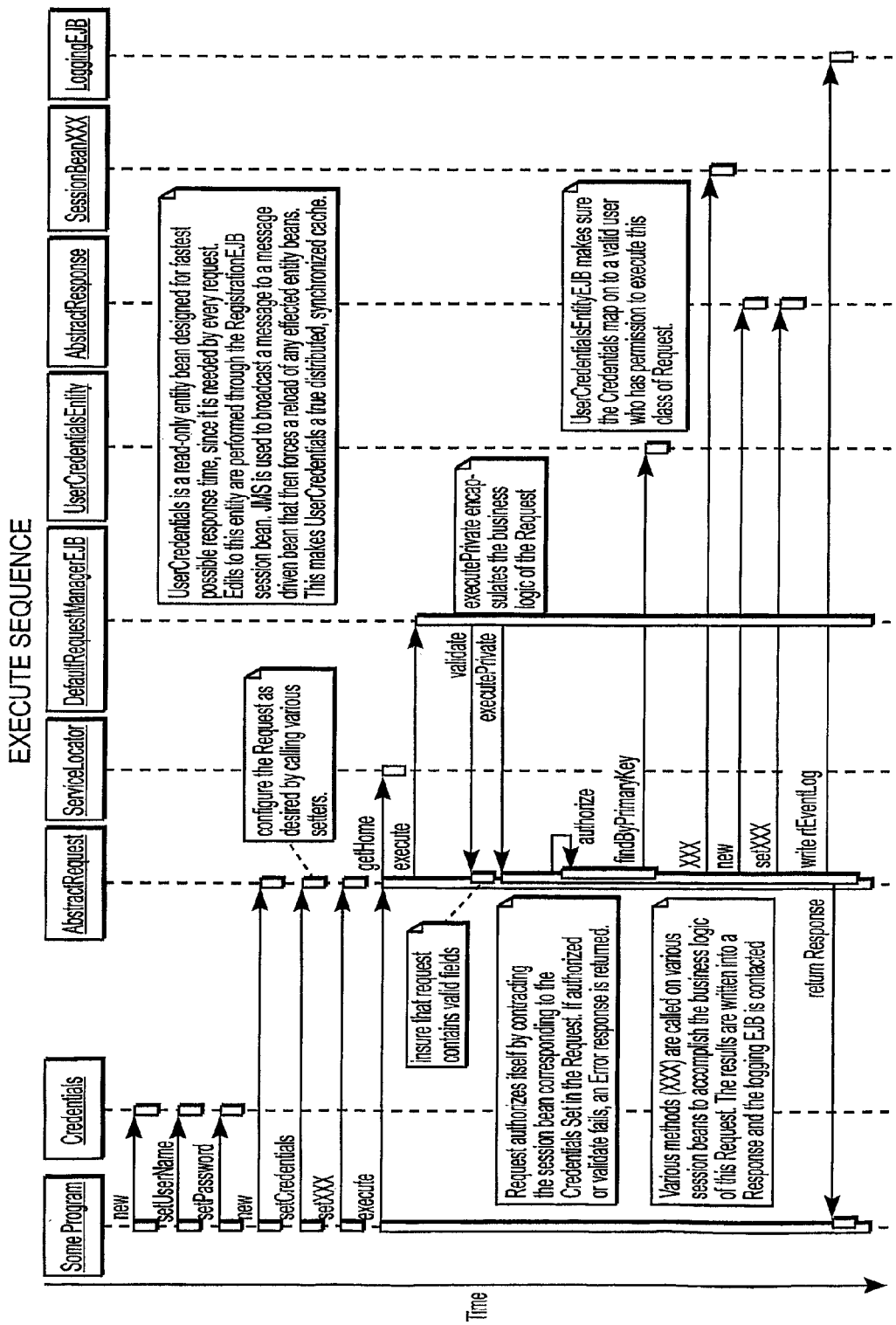
FIG. 6 is sequence diagram of an Execute Sequence for the Location Server shown in FIG. 5, in accordance with one embodiment of the present invention.

Referring to FIG. 6, there is shown a sequence diagram of a generic Execute Sequence for the Location Server 508, in accordance with one embodiment of the present invention. FIG. 6 illustrates how requests are submitted by client applications to the Location Server 508 for execution and how responses are returned. A sequence diagram like the ones shown in FIGS. 6-10 is commonly used in software design, and those with ordinary skill in the art would understand that the vertical axis represents the passage of time and the horizontal axis represents various objects in the Location Server 508. The objects can be located one or more servers in the distributed computer network 500. The type of design pattern shown in FIG. 6 is commonly referred to as a "command pattern."

The box labeled "Some Program" in the upper right hand corner denotes any software that uses a client API to communicate with the Location Server 508 to create requests. Requests can include credentials so that security and authentication mechanisms can be applied. In this case, Credentials constitutes a username and password that map onto various levels of access permission associated with the various requests. AbstractRequest is used to denote any request in the platform that is a subclass of AbstractRequest. ServiceLocator is a design pattern used to consolidate network lookups, in this case Java Naming and Directory Interface (JNDI) necessary to obtain a HomeInterface. DefaultRequestManager is the system that executes requests. Following the command design pattern, the DefaultRequestManager performs validation and authentication prior to calling the request's executePrivate method. Subclasses of AbstractRequest contain business logic in their executePrivate method. This business logic will call various system services, possibly including various session beans (hereinafter also referred to as SessionBeanXXX). The executePrivate method returns a response subclassing AbstractResponse. The DefaultRequestManager logs information related to the execution of the request.

In the embodiment described above, all Command API objects in the Location Server 508 are requests. Thus, the sequence in FIG. 6 serves as a generalization of how any API Command is executed. The DefaultRequestManager is implemented as an Enterprise Java Bean, thus the command is passed to the DefaultRequestManger Session Bean using Remote Method Invocation (RMI). An example of a request that Some Program might execute is ListNearbyUsers (See FIG. 3).

Figure 7:
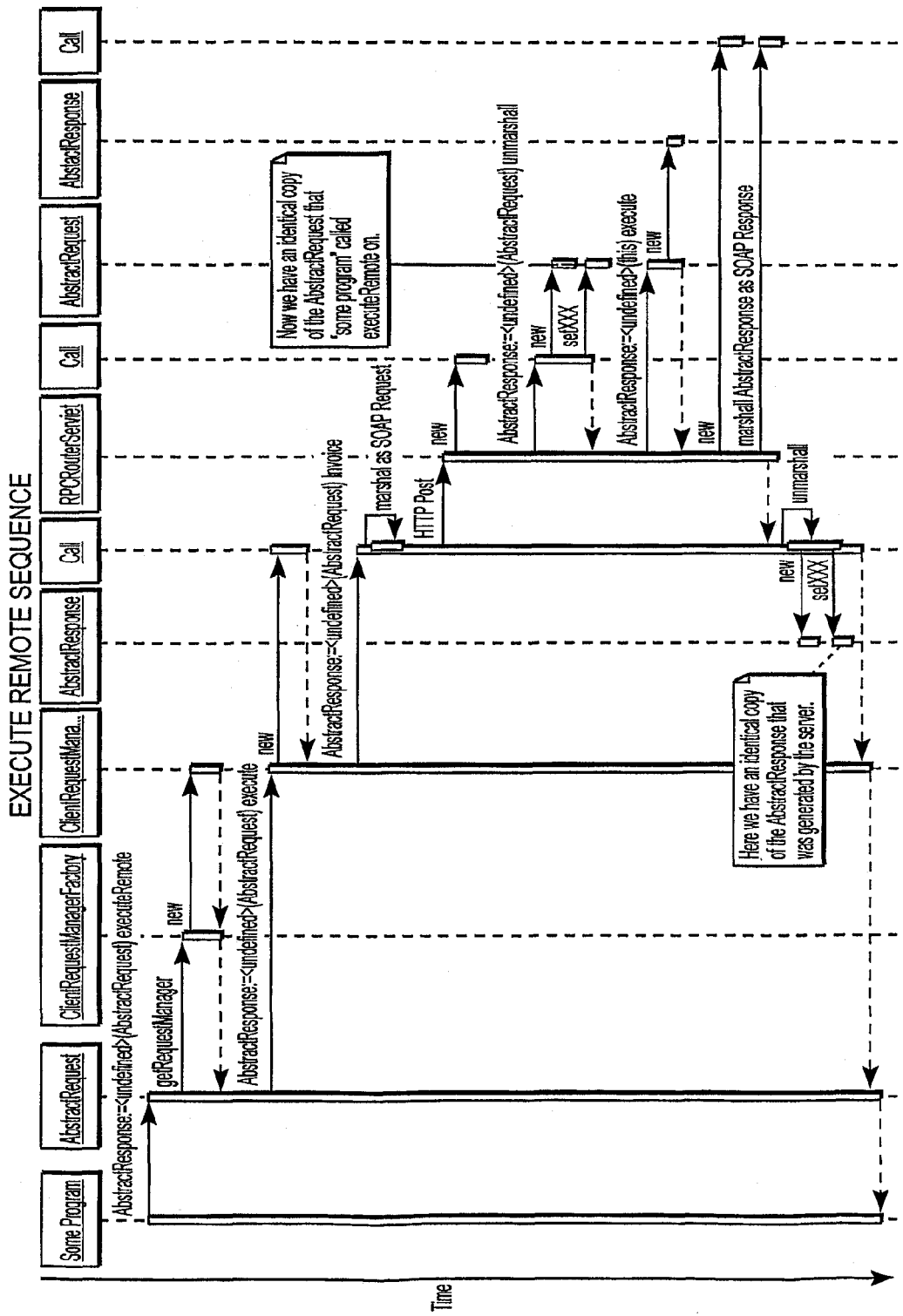
FIG. 7 is a sequence diagram of an Execute Remote Sequence for the Location Server shown in FIG. 5, in accordance with one embodiment of the present invention.

Referring to FIG. 7, there is shown a sequence diagram for an Execute Remote Sequence for the Location Server 508, in accordance with one embodiment of the present invention. The Execute Remote Sequence is a variation of the Execute Sequence shown in FIG. 6. The Execute Remote Sequence can be used when RMI is not suitable because of firewalls and other problems with RMI. This sequence details how the subclass of AbstractRequest submits itself to a clientRequestManager that marshals the command as XML compliant to the Simple Object Access Protocol (SOAP).

As illustrated in FIG. 7, the receiving RPCRouterServlet unmarshals the XML into the corresponding request bean. From this point onward, execution occurs identically to the Execute Sequence in FIG. 6. The response returned by the Execute Sequence is marshaled as SOAP by the RPCRouterServlet and returned to the ClientRequestManager. The ClientRequestManager unmarshals the XML into the corresponding response that is returned to Some Program.

Figure 8:
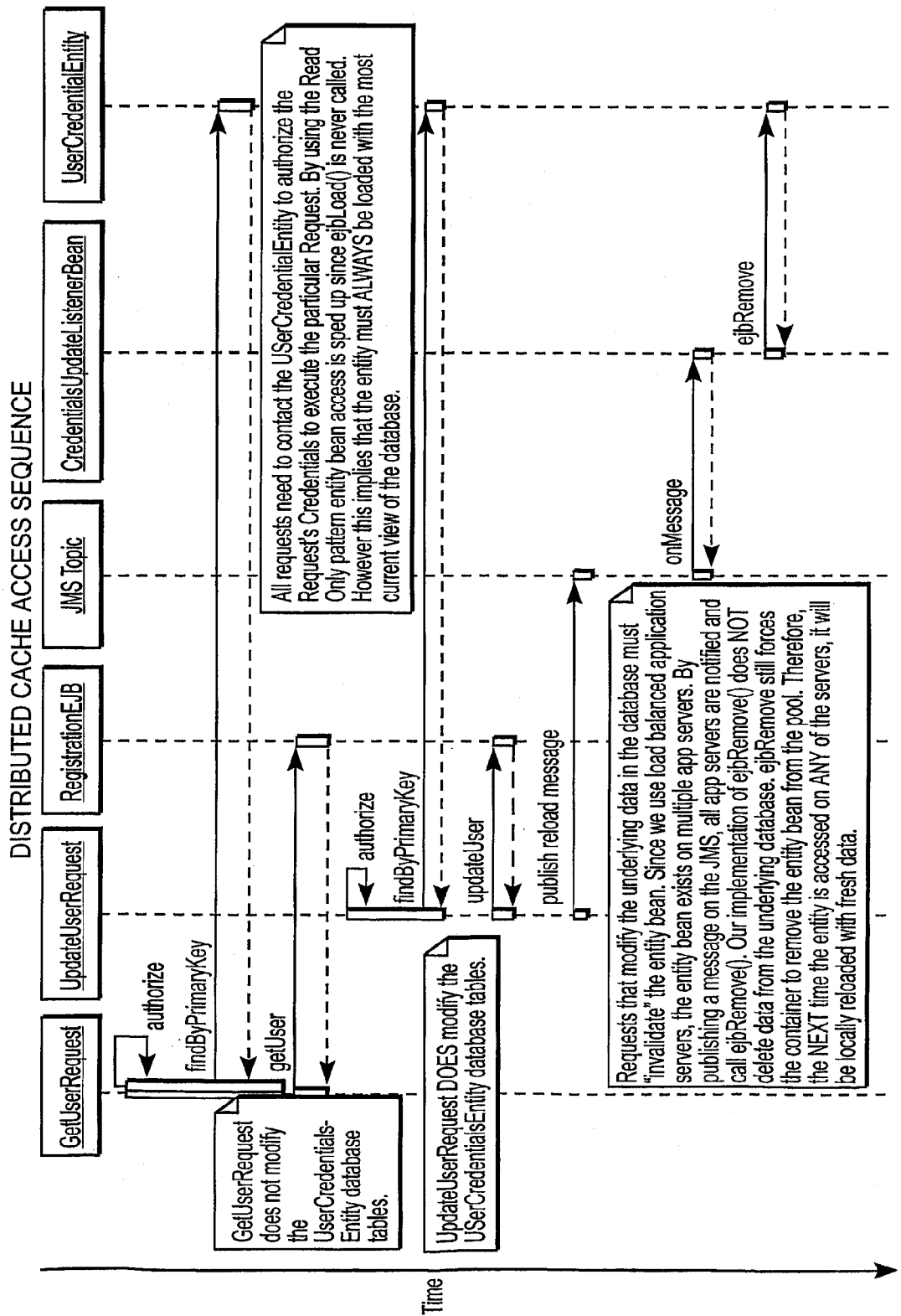
FIG. 8 is a sequence diagram of a Distributed Cache Access Sequence for the Location Server shown in FIG. 5, in accordance with one embodiment of the present invention.

Referring to FIG. 8, there is shown a sequence diagram of a Distributed Cache Access Sequence for the Location Server 508, in accordance with one embodiment of the present invention. Entity beans (Java) representing the underlying data store are used to cache data in the Location Server 508. When using load-balanced application servers, multiple copies of the same cache need to exist on each application server. This introduces a cache coherency problem if the cache is modified on any particular server.

In one embodiment, the cache itself is read only. Writes must be performed through a session bean (Java) to the underlying data store. When a write occurs, the JMS is used to send a Publish message that is received by a Message Driven Bean residing on each application system 510. The Message Driven Bean forces a reload of the entity bean by calling EJBRemove on the entity bean that has become "dirty". This distributed caching scheme provides benefits when reads occur frequently and writes occur infrequently. This implies that for most reads, the cache will be clean and a database read is avoided. Using the WEBLOGIC™ 6.0 read-only pattern has further benefits in eliminating unnecessary transactional support associated with entity beans.

Figure 9:
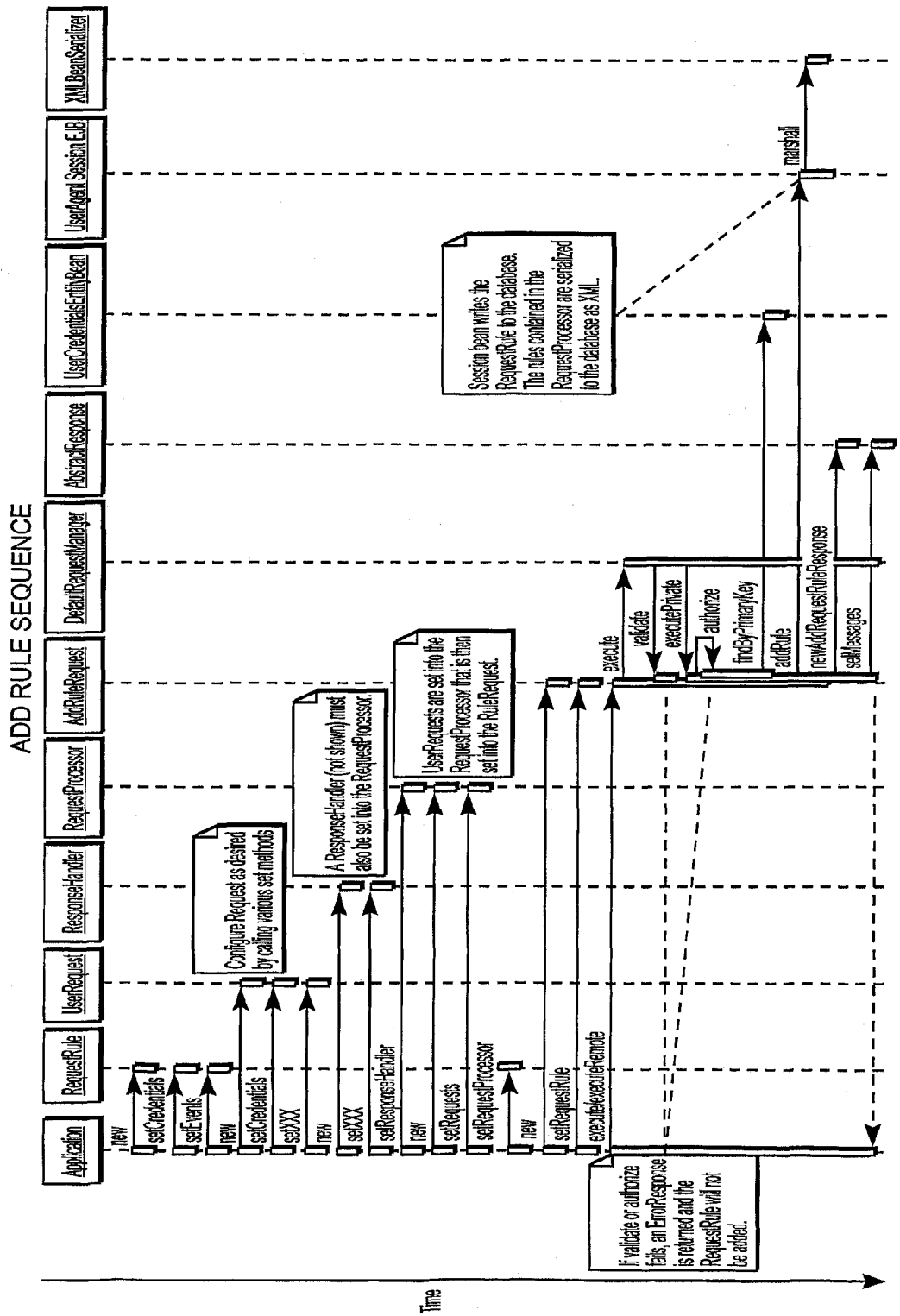
FIG. 9 is a sequence diagram of an Add Rule Sequence for the Location Server shown in FIG. 5, in accordance with one embodiment of the present invention.

Referring to FIG. 9, there is shown a sequence diagram for an Add Rule Sequence for the Location Server 508 in accordance with one embodiment of the present invention. FIG. 9 illustrates an alternate sequence when asynchronous behavior is desired from the LBS system 500 (as opposed to synchronous behavior, as exemplified by the command design pattern). The class diagram shown in FIG. 2 illustrates the relationship between Rules, Actions and Events, as described herein.

The Add Rule Sequence is relevant when an end user wants to instruct the system to "take this ListNearbyUsers and execute it only when the user is in a city other than his home." Likewise, to address privacy concerns, the instruction could be "take this ListNearbyUsers and execute it only between the hours of 9:00 a.m. and 9:00 p.m., on Monday thru Friday (or any other time) when I am not at work (or any other location)." Such an end-user instruction is presented to the Location Server 508 via the application system 510, as described with reference to FIG. 1A. This sequence "persists" the Rule within the system and enables the Location Server 508 to "remember" the rule and raise events based on a single rule, delivered to the Location Server 508 once. Upon receiving such a Rule, the Location Server 508 will execute the requests associated with the Rule via an Action under the specified Event conditions. The Location Server 508 must also know what to do with the response when it executes the request(s) associated with the Rule. The application system 510 therefore provides the Location Server 508 with a ResponseHandler that knows how to deliver the response(s) to the application system 510, as described with reference to FIG. 4.

A RequestRule aggregates events that an application system 510 can use to determine when and where to execute the requests that the application system 510 wanted asynchronously executed. The application system 510 must also create an object called RequestProcessor. The RequestProcessor is essentially a "container" into which an application system 510 places all the requests it wants a particular RequestRule to execute. The RequestProcessor corresponds to the abstract class Action 210, as described with reference to FIG. 2. The application system 510 must also provide delivery information, so that when the Location Server 508 executes all the requests in the RequestProcessor the Location Server 508 can deliver the responses to the application system 510. This can be accomplished via a JMS Topic or similar pub/sub mechanism. Since the Location Server 508 only knows how to execute requests, it creates a request that allows the application system 510 to add a RequestRule (itself a request) that in turn contains the original request that the application system 510 wanted asynchronously executed. This is called an AddRuleRequest (recursive). The sequence in FIG. 9 illustrates how to create a RequestRule, set it into an AddRuleRequest and execute the AddRuleRequest.

Figure 10A:
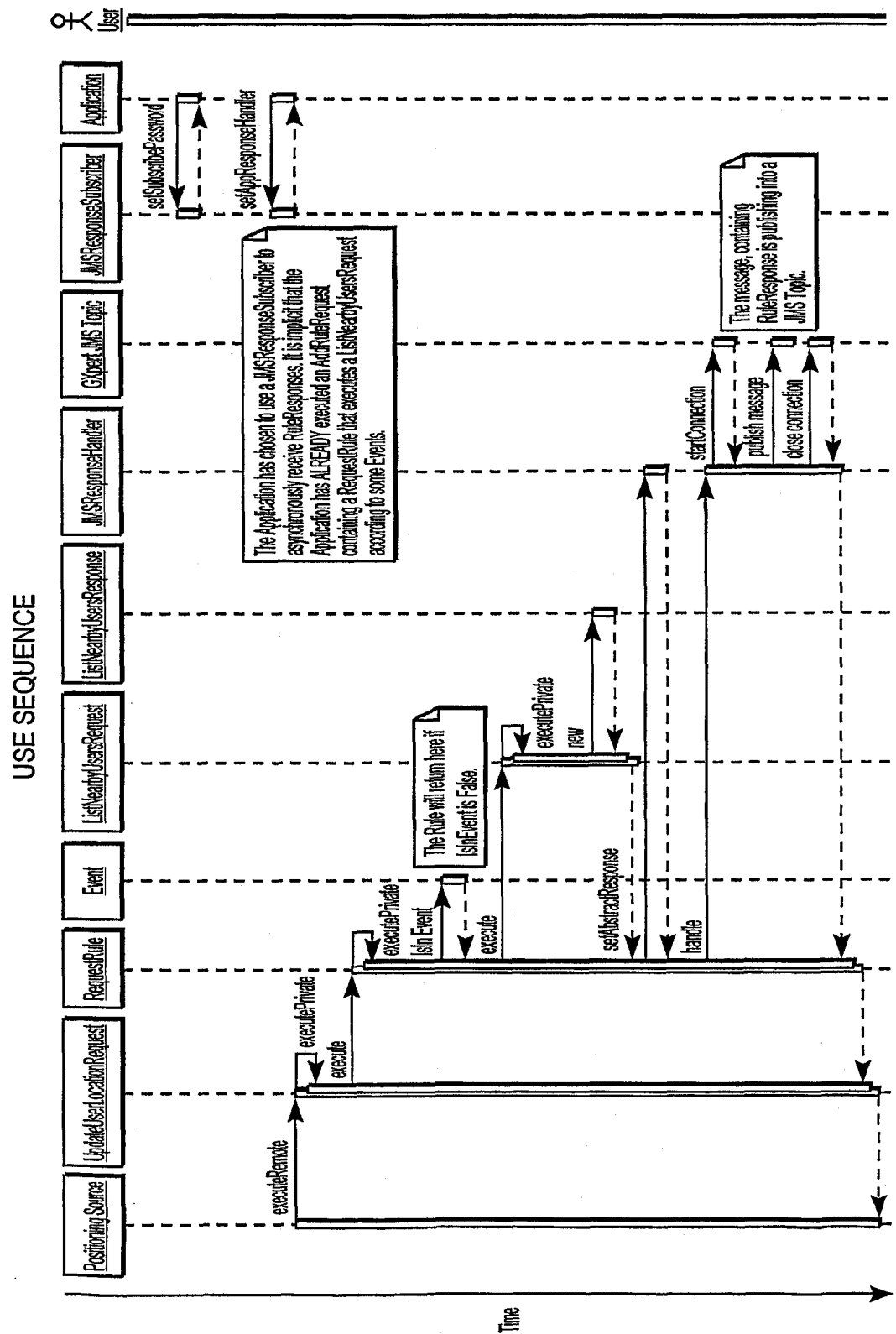
FIGS. 10A and 10B together illustrate is a sequence diagram of a Use Sequence for the Location Server shown in FIG. 5, in accordance with one embodiment of the present invention.
Figure 10B:
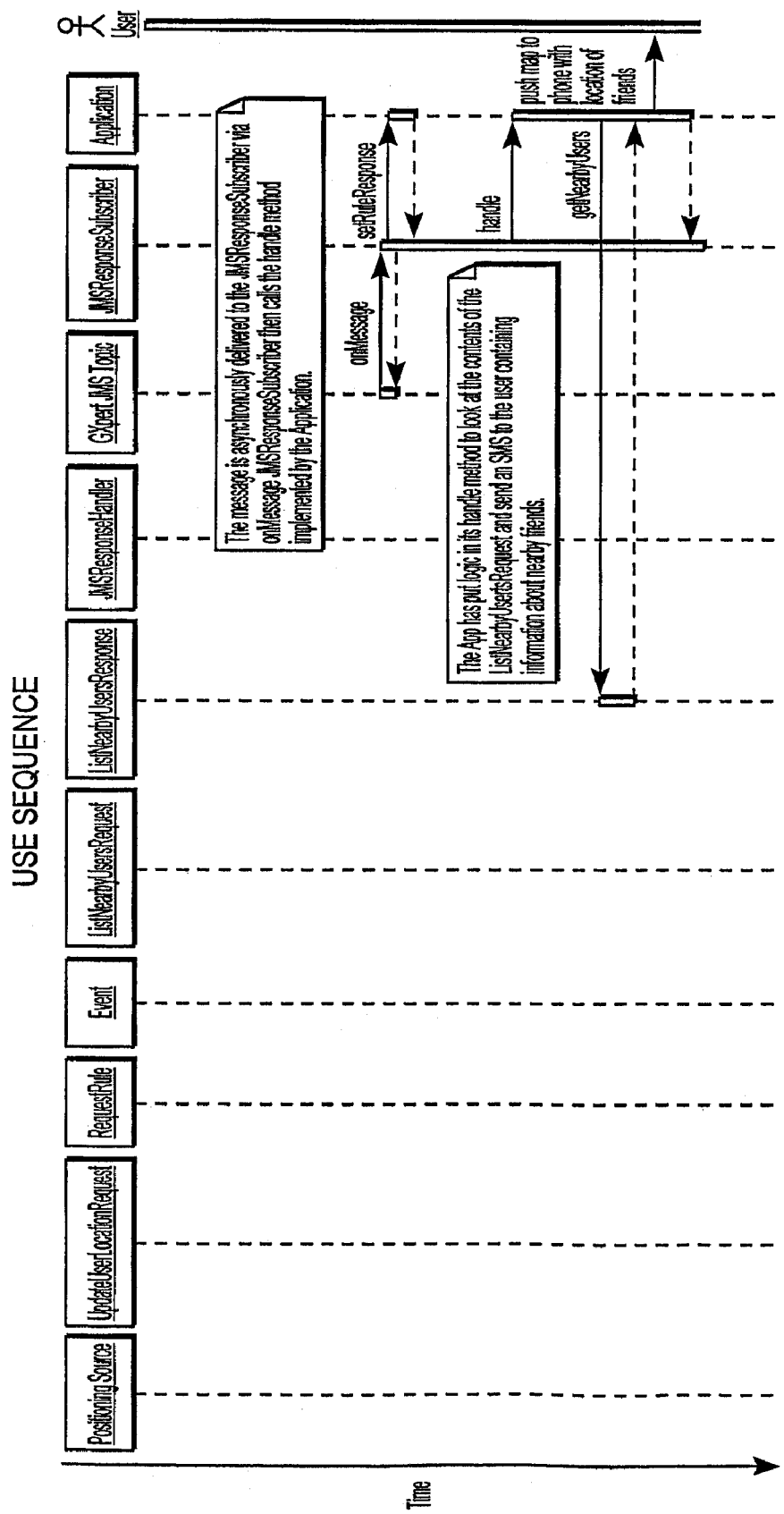

FIGS. 10A and 10B together illustrate a sequence diagram of a Use Sequence for the Location Server 508, in accordance with one embodiment of the present invention. This sequence assumes an AddRuleRequest has been executed that successfully persisted a RequestRule in the system. Further, it is assumed that the RuleRequest contained a RequestProcessor containing a certain implementation of the IResponseHandler interface named JMSResponseHandler 404 (FIG. 4). JMSResponseHandler 404 uses mechanisms, like Topics, to asynchronously publish messages.

The sequence starts with the application system 510 employing a JMSResponseSubscriber 516 (FIG. 5) to receive any message published by the system upon rule execution. Some time later, the system runs the RequestRule in response to an UpdateLocationRequest. It should be understood that the system could also run the RequestRule in response to any other request as well. For purposes of this example, we will assume that the triggering request is the UpdateLocationRequest, which means that a new location has been reported for the user so the user's rules are evaluated. If any of the events in a rule are presently occurring as defined by methods in the event object (for example, Is Time Between 9am and 9pm? Returns "True"), the RequestRule will invoke the RequestProcessor. The RequestProcessor will call execute on all requests contained in said RequestProcessor. The DefaultrequestManager will produce responses for each Request executed. The RequestProcessor will call handle() on the ResponseHandler.

In the embodiment shown in FIG. 5, the ResponseHandler is a JMSResponseHandler 404 (FIG. 4). In the JMSResponseHandler 404, the handle( ) method delivers responses to the JMSResponseSubscriber 516 via publishing an ObjectMessage on a JMS Topic. Because the JMSResponseSubscriber 516 implements onMessage( ), it can receive asynchronous messages from the JMSResponsHandler 404. Upon receipt of an ObjectMessage containing a RuleResponse (aggregating various responses from executed requests), the JMSResponseHandler 404 calls the handler method implemented by the application system 510. Thus, the application system 510 actually implements the IResponseHandler interface.

In this embodiment, the user's RequestRules will be invoked every time the user's location is updated. Therefore, a course grained entity bean design pattern (known in the art) is coupled with the distributed cache described earlier. This creates a high performance rules caching system that does not need to read the database server 530 (FIG. 5) in order to run the rule. Furthermore, this allows the distributed computer network 500 to scale by adding additional application systems as the users base grows and the accompanying number of rules grows.

The above description is included to illustrate the operation of the preferred embodiments and is not meant to limit the scope of the invention. Rather, the scope of the invention is to be limited only by the claims. From the above discussion, many variations will be apparent to one skilled in the relevant art that would yet be encompassed by the spirit and scope of the invention.

What is claimed is:

1. A method for providing location-based services to a mobile unit, the method comprising:
providing, by an application system, a rule to a rules system, the rule including a location-based trigger condition, the trigger condition including a description of a location-based event;
receiving at the application system, directly responsive to the location-based trigger condition being satisfied by an occurrence of the location-based event, an indication from the rules system that the location-based event has occurred; and
providing, by the application system and responsive to the indication, a location-based service to the mobile unit.

2. The method of claim 1 wherein the location-based service includes sending a message to the mobile unit.

3. The method of claim 2 wherein the message is an advertisement.

4. The method of claim 1 wherein the trigger condition includes a time of day.

5. The method of claim 1 wherein the trigger condition includes preference data associated with the mobile unit.

6. The method of claim 1 wherein the trigger condition includes a location of a second mobile unit.

7. The method of claim 1 wherein the location-based service includes making the mobile unit invisible to location-based requests.

8. The method of claim 1 wherein the location-based service includes making the mobile unit visible to location-based requests.

9. The method of claim 1 wherein the application system provides the location-based service to the mobile unit via electronic mail.

10. The method of claim 1 wherein the application system provides the location-based service to the mobile unit via an instant message.

11. The method of claim 1 wherein the application system provides the location-based service to the mobile unit via a paging interface.

12. The method of claim 1 wherein the location-based service includes providing the mobile unit with a location of the mobile unit.

13. A system for providing location-based services to a mobile unit, comprising:
an application system, adapted to:
provide a rule to a rules system, the rule including a location-based trigger condition, the trigger condition including a description of a location-based event;
receive an indication from the rules system, directly responsive to the occurrence of the trigger condition being satisfied by an occurrence of the location-based event, that the trigger condition has occurred; and
provide, responsive to the indication, a location-based service to the mobile unit.

14. A system for providing location-based services to a mobile unit, comprising:
a positioning system, adapted to determine a position of a mobile unit;
a rules system, coupled to the positioning system, adapted to evaluate whether a location-based trigger condition has been satisfied, the location-based trigger condition satisfied at least in part by the position of the mobile unit; and
an application system, coupled to the rules system, adapted to provide the location-based trigger condition to the rules system,
wherein the rules system is further adapted to provide an indication to the application system directly responsive to a determination that the location-based trigger condition has been satisfied, and,
wherein the application system is further adapted, responsive to receiving the indication from the rules system that the location-based trigger condition has been satisfied, to provide location-based services to the mobile unit.

15. The system of claim 14 wherein the positioning system is operated by a mobile telecommunications carrier.

16. The system of claim 15 wherein the application system is not operated by the mobile telecommunications carrier.

17. The system of claim 14 wherein the positioning system is operated by a mobile telecommunications carrier and the rules system are operated by an application services provider.

18. The system of claim 15, further comprising:
a database operatively coupled to the rules system for providing geographic information, wherein the rules system uses the geographic information to determine whether the location-based trigger condition has been satisfied.

19. The system of claim 18, wherein the database is a Geographic Information System (GIS) database.

20. A computer program product for providing location-based services to a mobile unit, the computer program product stored on a non-transitory computer-readable medium and including instructions for causing a computer to carry out the steps of: providing, by an application system, a rule to a rules system, the rule including a location-based trigger condition, the trigger condition including a description of a location-based event; receiving at the application system, directly responsive to the trigger condition being satisfied by an occurrence of the location-based event, an indication from the rules system that the location-based event has occurred; and providing, by the application system and responsive to the indication, a location-based service to the mobile unit.

21. A method for providing location-based services to a mobile unit, the method comprising:
receiving a rule at a rules system, the rule including a location-based trigger condition, the trigger condition including a description of a location-based event;
receiving information indicative of the current position of a mobile unit;

determining from the rule that the current position information satisfies the description of the location-based event and that the trigger condition has occurred;

directly responsive to the determination, providing to an application system an indication that the trigger condition has occurred; and providing, by the application system and responsive to the indication, a location-based service to the mobile unit.

22. A method for receiving location-based services at a mobile unit, the method comprising:

providing a rule to a rules system, the rule including a location-based trigger condition, the trigger condition including a description of a location-based event;

providing information indicative of the current position of a mobile unit to the rules system, the current position information satisfying the description of the location-based event and causing the trigger condition to be satisfied; and receiving, from an application system, a location-based service at the mobile unit, the location-based service received upon the triggering condition being satisfied.

23. A method for providing location-based services to a mobile unit, the method comprising:

receiving a rule at a rules system, the rule including a location-based trigger condition, the trigger condition including a description of a location-based event;

receiving at the rules system information indicative of the current position of a mobile unit;

determining by the rules system from the rule that the current position information satisfies the description of the location-based event and that the trigger condition has occurred; and directly responsive to the determination, providing to an application system configured to provide services to mobile units an indication that the trigger condition has occurred.

24. A computer program product for providing location-based services to a mobile unit, the computer program product stored on a non-transitory computer-readable medium and including instructions for causing a computer to carry out the steps of: receiving a rule, the rule including a location-based trigger condition, the trigger condition including a description of a location-based event; receiving information indicative of the current position of a mobile unit; determining from the rule that the current position information satisfies the description of the location-based event and that the trigger condition has occurred; and directly responsive to the determination, providing to an application system configured to provide services to mobile units an indication that the trigger condition has occurred.

* * * * *